United States Patent
Smiljanic et al.

(10) Patent No.: US 9,183,113 B2
(45) Date of Patent: Nov. 10, 2015

(54) DEBUGGING ANALYSIS IN RUNNING MULTI-USER SYSTEMS

(75) Inventors: John Smiljanic, Austin, TX (US); Shailesh Vinayaka, Los Gatos, CA (US); James Driscoll, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 417 days.

(21) Appl. No.: 13/593,098

(22) Filed: Aug. 23, 2012

(65) Prior Publication Data

US 2013/0086424 A1    Apr. 4, 2013

Related U.S. Application Data

(63) Continuation-in-part of application No. 13/328,728, filed on Dec. 16, 2011.

(60) Provisional application No. 61/540,656, filed on Sep. 29, 2011.

(51) Int. Cl.
*G06F 9/44* (2006.01)
*G06F 11/00* (2006.01)
*G06F 11/36* (2006.01)

(52) U.S. Cl.
CPC ............ *G06F 11/3612* (2013.01); *G06F 11/36* (2013.01); *G06F 11/362* (2013.01); *G06F 11/3636* (2013.01); *G06F 11/3664* (2013.01)

(58) Field of Classification Search
None
See application file for complete search history.

(56) References Cited

U.S. PATENT DOCUMENTS

| | | |
|---|---|---|
| 5,121,498 A | 6/1992 | Gilbert et al. |
| 5,339,428 A | 8/1994 | Burmeister et al. |
| 6,148,402 A | 11/2000 | Campbell |
| 6,282,702 B1 | 8/2001 | Ungar |
| 6,516,416 B2 | 2/2003 | Gregg et al. |
| 6,681,384 B1 | 1/2004 | Bates et al. |
| 6,915,509 B1 | 7/2005 | Chkodrov et al. |
| 7,020,852 B2 | 3/2006 | Oeltjen et al. |
| 7,191,433 B2 | 3/2007 | Narad et al. |

(Continued)

FOREIGN PATENT DOCUMENTS

CN    104756086 A    7/2015

OTHER PUBLICATIONS

MacDonald, D. "Groovy AST Transform to Inject Spring Security Check for Java Caller", Sep. 12, 2011. 2 pages.

(Continued)

*Primary Examiner* — Lewis A Bullock, Jr.
*Assistant Examiner* — Mark Gooray
(74) *Attorney, Agent, or Firm* — Kilpatrick Townsend & Stockton LLP

(57) ABSTRACT

Various arrangements for debugging logic being executed by a webserver is presented. A virtual machine of the webserver may execute runtime threads for a plurality of remote users. The web server may compile business logic code received from a developer computer system via a web-based interface into an logic insight injected code. The logic insight injected code may be compiled from the business logic code to include debugging functionality. The virtual machine of the webserver may execute the logic insight injected code concurrently with the runtime threads being executed for the plurality of remote users. The debugging functionality of the logic insight injected code being executed may not affect execution of the runtime threads for the plurality of users.

20 Claims, 7 Drawing Sheets

(56) References Cited

U.S. PATENT DOCUMENTS

| | | | |
|---|---|---|---|
| 7,225,429 B2 | 5/2007 | Bates et al. | |
| 7,287,243 B2 | 10/2007 | Dollin et al. | |
| 7,290,288 B2 | 10/2007 | Gregg et al. | |
| 7,343,588 B2 | 3/2008 | Bates et al. | |
| 7,577,942 B2 | 8/2009 | Bates et al. | |
| 7,624,385 B2 | 11/2009 | Waddington et al. | |
| 7,685,570 B2 | 3/2010 | Draine et al. | |
| 7,774,172 B1 | 8/2010 | Yunt et al. | |
| 7,873,872 B1 | 1/2011 | Shillington et al. | |
| 7,917,894 B2 | 3/2011 | Chen et al. | |
| 8,104,021 B2 | 1/2012 | Erlingsson et al. | |
| 8,250,548 B2 | 8/2012 | Kasahara et al. | |
| 8,255,887 B2 | 8/2012 | Heil | |
| 8,332,828 B2 | 12/2012 | Vargas | |
| 8,392,885 B2 | 3/2013 | Stall et al. | |
| 8,418,135 B2 | 4/2013 | Proctor et al. | |
| 8,601,453 B2 | 12/2013 | Gennard et al. | |
| 8,627,303 B2 | 1/2014 | Adams et al. | |
| 8,677,141 B2 | 3/2014 | Erlingsson et al. | |
| 8,843,901 B2 | 9/2014 | Krajec et al. | |
| 8,863,085 B1 | 10/2014 | Stahlberg | |
| 8,869,121 B2 | 10/2014 | Vorbach et al. | |
| 8,887,138 B2 | 11/2014 | Eker et al. | |
| 2008/0127113 A1* | 5/2008 | Wu et al. | 717/129 |
| 2011/0173597 A1 | 7/2011 | Cascaval et al. | |
| 2011/0239307 A1 | 9/2011 | Joffray et al. | |
| 2011/0283266 A1* | 11/2011 | Gallagher et al. | 717/130 |
| 2011/0313981 A1 | 12/2011 | Ben-Natan | |
| 2012/0151452 A1* | 6/2012 | Zinkovsky et al. | 717/129 |
| 2013/0067441 A1 | 3/2013 | Lafreniere et al. | |
| 2013/0086424 A1 | 4/2013 | Smiljanic et al. | |
| 2015/0058824 A1 | 2/2015 | Smiljanic | |

OTHER PUBLICATIONS

MacDonald, D. "Groovy Logging Injection—AST Transformation", Sep. 16, 2011, 2 pages.

U.S. Appl. No. 13/328,728, Non-Final Office Action mailed on Jul. 16, 2014, 19 pages.

International Search Report and Written Opinion from PCT/US2014/048100 mailed on Oct. 8, 2014, 10 pages.

Unknown "Oracle Fusion Middleware Fusion Developer's Guide for Oracle Application Development Framework," 32 pages.

Camilo, et al. "Remote Debugging an EJB on WebLogic Server 10.0.1 with JDeveloper 10.1.3.3", 6 pages.

Champeau, C., "Customizing Groovy compilation process," Cedric Champeau's Weblog, May 12, 2011, [retrieved on May 1, 2012], 5 pages.

Non-Final Office Action mailed on Jan. 20, 2015 for U.S. Appl. No. 14/267,361, 11 pages.

Notice of Allowance mailed on Apr. 24, 2015 for U.S. Appl. No. 13/664,106, 5 pages.

Al-Sharif et al, "An Agent-Oriented Source-Level Debugger on Top of a Monitoring Framework", IEEE, pp. 241-247, 2009.

Danghui et al, "Design of a Real-Time Bus Monitor and Debugger for Embedded Systems", IEEE, 4665-4667, 2010.

Johnson et al, "Composable Multi-Level Debugging with Stackdb", ACM, pp. 213-225, 2014.

Kolomvatsos et al. "Debugging applcaations created by a Domain Specific Language: The IPAC case", The Journal of Systemts and Software, vol. 85, No. 4, Apr. 1, 2015, pp. 932-943, XP055093037.

Liang et al, "Debugging ObjectOriented Programs with Behavior Views", pp. 133-142, 2005.

Liu at al, "A Petri Net-based Distributed Debugger", IEEE, pp. 639-646, 1990.

Mega et al, "Debugging Distributed Object Applications with the Eclipse Platform", ACM, pp. 42-46, 2004.

International Preliminary Report on Patentability mailed May 14, 2015 from Patent Application No. PCT/US2013/067523, 8 pages.

Notice of Allowance mailed on May 28, 2015 from U.S. Appl. No. 14/267,361, 14 pages.

* cited by examiner

DEBUGGING ANALYSIS IN RUNNING MULTI-USER SYSTEMS

CROSS-REFERENCE TO RELATED APPLICATIONS

This application is a continuation-in-part of U.S. patent application Ser. No. 13/328,728, filed on Dec. 16, 2011, now U.S. Pat. No. 9,027,075, entitled "ENFORCING SECURITY RULES AT RUNTIME," that claims benefit under 35 U.S.C. 119(e) to U.S. patent application No. 61/540,656, filed Sep. 29, 2011, entitled "ENFORCING SECURITY RULES AT RUNTIME," both of which are hereby incorporated by reference in their entirety.

BACKGROUND

Typically, when a software developer is writing code, the developer will compile and execute the code in a debugging mode. A debugging mode allows the developer a window into how the code the developer has written is executing. When code is executed in a debugging mode, the developer can typically: view variable values during execution, set breakpoints at which execution of the code will halt until the developer triggers continued execution, and/or step through execution of the code on a line-by-line basis.

Such an arrangement may work well when the code being written by the developer is being compiled, debugged, and/or executed at a computer system local to the developer. However, when a remote computer system is being used to compile and execute software, a debugging mode may not be available. A multi-user webserver may compile and execute code for multiple users simultaneously. Therefore, a first user may be executing a first piece of code while a second user may be executing a second piece of code. These users may be unaffiliated.

A webserver being used to compile and execute the code for the multiple users may only operate in a debugging mode or a runtime mode (execution of compiled code without debugging) at a given time. As such, either all users executing code on the webserver would need to use the debugging mode or all users would need to use the runtime mode at a given time.

It may be desired that one or more users compiling and/or executing code on a webserver be permitted to function in a runtime mode unaffected by one or more developers that are debugging code.

SUMMARY

Various arrangements for debugging logic being executed by a webserver are presented. In some embodiments, a method for debugging logic being executed by a webserver is presented. The method may include executing, by a virtual machine of the webserver, runtime threads for a plurality of remote users. The method may include compiling, by the web server, business logic code received from a developer computer system via a web-based interface into an logic insight injected code. The logic insight injected code may be compiled from the business logic code to include debugging functionality. The method may include executing, by the virtual machine of the webserver, the logic insight injected code concurrently with the runtime threads being executed for the plurality of remote users. The logic insight injected code may be executed as a logic insight thread. The debugging functionality of the logic insight injected code being executed may not affect execution of the runtime threads for the plurality of remote users.

Embodiments of such a method may include one or more of the following: Compiling the business logic code received from the developer computer system via the web-based interface into the logic insight injected code may include identifying, by the webserver, a plurality of expressions in the business logic code; modifying, by the webserver, the plurality of expressions in the business logic code to include the debugging functionality; and following modifying the plurality of expressions in the business logic code to include the debugging functionality, compiling the modified business logic code into the logic insight injected code. The debugging functionality may include during execution, halting execution and waiting for input from the developer computer system that indicates to proceed with execution after one or more expressions of the plurality of expressions. Halting execution may be in response to a breakpoint received from the developer computer system. The method may include executing, by the virtual machine of the webserver, a plurality of logic insight threads associated with a plurality of logic insight injected codes concurrently being executed with the runtime threads for the plurality of remote users, wherein the plurality of logic insight injected codes include the logic insight injected code. The debugging functionality may include, during execution, sending an indication to the developer computer system that indicates an expression of the plurality of expressions has finished being executed.

Embodiments of such a method may alternatively or additionally include one or more of the following: The debugging functionality may include sending indications to the developer computer system of a value of a variable. The variable may be present within the plurality of expressions of the business logic code. The method may include sending, by the virtual machine of the webserver, an indication of the value of the variable when the value of the variable has been modified. The method may include receiving, by the webserver from the developer computer system, the business logic code. The method may include receiving, by the webserver from the developer computer system, an indication the business logic code is to be debugged. The method may include halting, by the virtual machine of the webserver, execution of the logic insight thread after a first expression of the plurality of expressions, wherein halting the execution of the logic insight thread does not affect execution of the runtime threads for the plurality of remote users. The method may include receiving, by the virtual machine of the webserver, input that indicates to proceed with execution after halting. The method may include executing, by the virtual machine of the webserver, the logic insight thread until after a second expression of the plurality of expressions. The method may include providing, by the webserver to the developer computer system via the Internet, a user interface configured to receive the business logic code for compiling and execution by the webserver. At least some of the runtime threads may be based on business logic code different from at least some other runtime threads of the runtime threads.

In some embodiments, a system for debugging logic being executed by a webserver. The system may include a developer computer system configured to provide a web-based interface and communicate with the webserver via a network. The system may include the webserver. The webserver may be configured to execute, by a virtual machine of the webserver, runtime threads for a plurality of remote users. The webserver may be configured to compile, by the webserver, business logic code received from the developer computer system via the web-based interface into an logic insight injected code. The logic insight injected code may be compiled from the business logic code to include debugging functionality. The webserver may be configured to execute, by the virtual machine of the webserver, the logic insight injected code concurrently with the runtime threads being executed for the plurality of remote users. The logic insight injected code may be executed as a logic insight thread. The debugging functionality of the logic insight injected code being executed may not affect execution of the runtime threads for the plurality of remote users.

Embodiments of such a system may include one or more of the following: The webserver being configured to compile the business logic code received from the developer computer system via the web-based interface into the logic insight injected code may include the webserver being configured to identify a plurality of expressions in the business logic code; modify the plurality of expressions in the business logic code to include the debugging functionality; and following modifying the plurality of expressions in the business logic code to include debugging functionality, compile the modified business logic code into the logic insight injected code. The debugging functionality may include the webserver being configured to: during execution, halt execution and wait for input from the developer computer system that indicates to proceed with execution after one or more expressions of the plurality of expressions. The webserver may be configured to halt execution is in response to a breakpoint received from the developer computer system. The webserver may be further configured to execute, by the virtual machine of the webserver, a plurality of logic insight threads associated with a plurality of logic insight injected codes concurrently with the runtime threads being executed for the plurality of remote users, wherein the plurality of logic insight injected codes include the logic insight injected code.

In some embodiments, a computer program product for debugging logic being executed by a webserver is presented. The computer program product may comprise instructions which, when executed by the webserver, cause the webserver to execute, by a virtual machine, runtime threads for a plurality of remote users. The computer program product may comprise instructions which, when executed by the webserver, cause the webserver to compile business logic code received from a developer computer system via a web-based interface into an logic insight injected code. The logic insight injected code may be compiled from the business logic code to include debugging functionality. The computer program product may comprise instructions which, when executed by the webserver, cause the webserver to execute, by the virtual machine, the logic insight injected code concurrently with the runtime threads being executed for the plurality of remote users. The logic insight injected code may be executed as a logic insight thread. The debugging functionality of the logic insight injected code being executed may not affect execution of the runtime threads for the plurality of remote users.

Embodiments of such a computer program product may include one or more of the following: The instructions may further comprise additional instructions, which, when executed by the webserver, cause the webserver to provide to the developer computer system via the Internet a user interface configured to receive the business logic code for compiling and execution by the webserver. The instructions may further comprise additional instructions, which, when executed by the webserver, cause the webserver to receive, from the developer computer system, the business logic code; and receive, from the developer computer system, an indication the business logic code is to be debugged.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
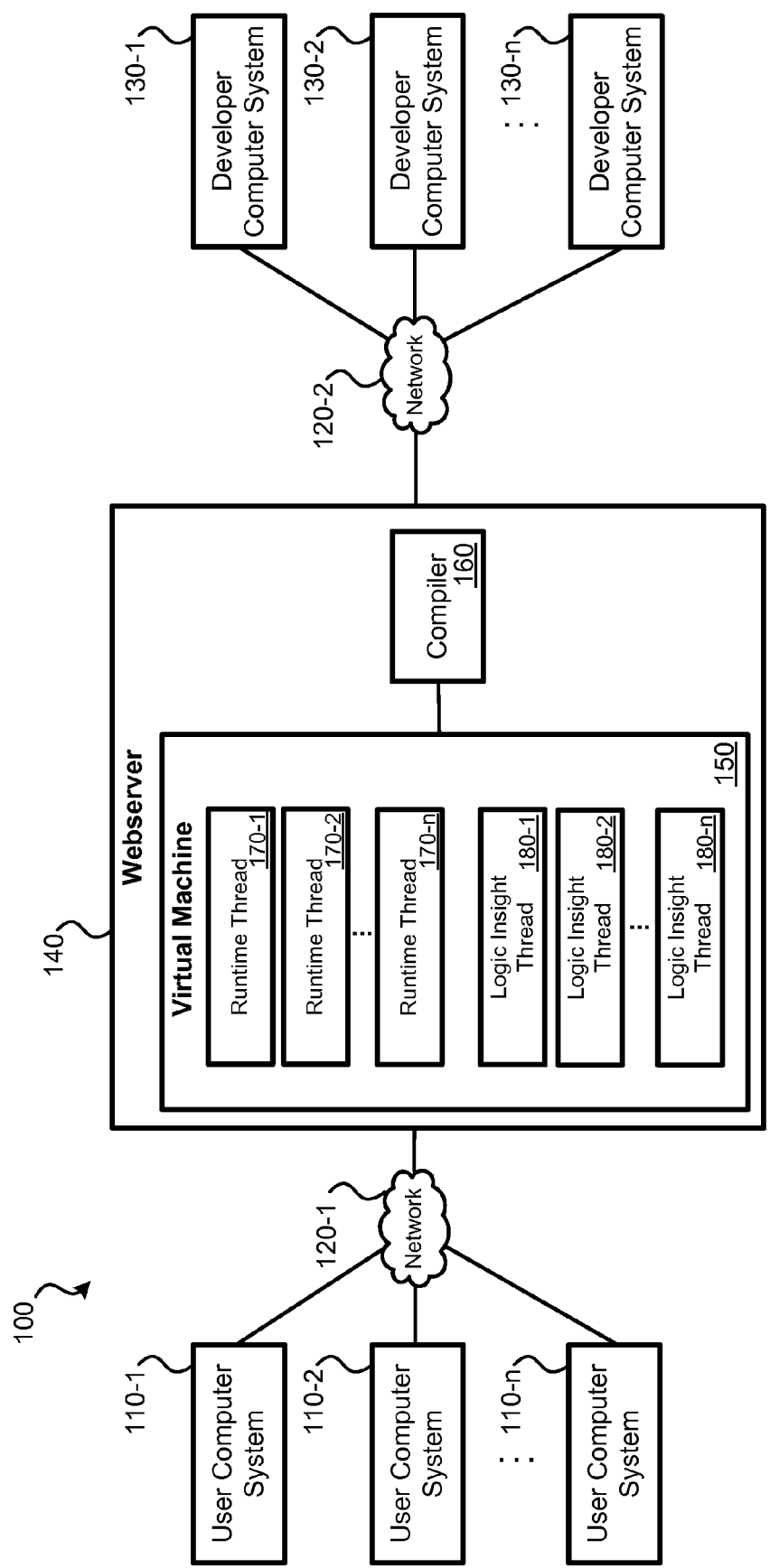
FIG. 1 illustrates an embodiment of a system configured to execute runtime threads and logic insight threads for debugging simultaneously for multiple users.

A webserver may be used to compile and execute business logic code for multiple users simultaneously. Some users, who may be accessing the webserver via a network connection, may have a runtime thread being executed by the web server. Such a runtime thread may refer to compiled business logic code that is being executed without debugging functionality. As such, a runtime thread being executed by the webserver may not contain breakpoints, may not stop and wait for input to proceed with executing each expression in the business logic code, and may not output values of various variables present within the business logic code. Different users of the webserver may be associated with different runtime threads. Runtime threads being executed for different users may correspond to the same or different business logic code. As such, a user accessing the webserver via the Internet may have the webserver executing a runtime thread while another user accessing the webserver via the Internet may have the webserver executing a second runtime thread that is unrelated to the first runtime thread.

The runtime threads for the multiple users being executed by the webserver may be executed by a virtual machine of the webserver. This virtual machine may be configured to run in either a debugging mode or a runtime mode. These modes may be exclusive; all threads being executed by the virtual machine may need to be executed in debugging mode or all threads being executed by the virtual machine may need to be executed in runtime mode.

If a particular user (e.g., a business logic developer) desires to test business logic code, such as business logic code the developer has written or modified, a debugging mode may be desired by the developer. Debugging may allow the developer to do one or more of the following: set breakpoints in the business logic code at which point execution of the business logic pauses until the developer indicates execution is to continue; allow execution of the business logic to be stepped through on an expression-by-expression basis; and view and/or edit the values of variables.

Typically, a virtual machine, which may be used to execute injected-code in a webserver, can only be operated in a particular mode at a given time: a debugging mode or a runtime mode (which does not permit breakpoints, expression-by-expression execution, or viewed and/or editing of variables). As such, if the virtual machine is run in debugging mode to allow one or more developers to debug injected code, the execution of the injected code for other users on the webserver may be affected and forced to also run in a debugging mode. As such, having the same virtual machine execute one or more threads of which some are being debugged concurrently while one or more other threads are run in a runtime mode (without debugging functionality) may be desired to allow all users accessing the webserver to have code executed in the desired mode.

To allow one or more developers to debug code while threads are concurrently being executed in runtime mode without debugging functionality, the virtual machine may be run in runtime mode. However, when the code that is desired to be debugged is compiled, the compiler may edit the expressions of the code being compiled to include debugging functionality. Once compiled, the bytecode created from the code may be executed by the virtual machine as a runtime. As such, from the point-of-view of the virtual machine, the thread is executed as a runtime; however, from the point-of-view of the developer, the thread has debugging functionality that allows the code to be debugged, because debugging functionality was coded into the code during the compiling process.

Compiling code that is desired to be debugged may involve expressions present within the code received from the developer being modified and/or additional expressions being added. Such additions and/or modifications may result in the compiled code: pausing after the execution of each expression; outputting an indication that an expression has begun being processed; outputting an indication that an expression has finished being processed; and/or outputting indications of the values of variables present within the code. Each of these additions and/or modifications may result in the developer being able to debug the code as the code is being executed (e.g., in real time) as a runtime.

The virtual machine may be executing a thread of the code being debugged in runtime mode concurrently with other threads corresponding to other code being executed as a runtime for other users. To the developer performing the debugging, the modification and/or addition of expressions in the developer's code provides the developer with debugging functionality without the virtual machine needing to run in a debugging mode.

The following systems and methods provide detail as to how a multi-user system, such as a webserver, can be used to simultaneously execute threads in a runtime mode for one or more users while one or more developers are executing threads for debugging.

The principles described herein may be applicable to various programming languages. As detailed herein, examples are focused on what is referred to as business logic code. Business logic code may be written in a programming language, such as JAVA and GROOVY, and may apply to a particular "business domain." For instance, expressions may permit for functions to be performed that are specific to accounting or insurance. Business logic may be thought of as allowing for higher-level programming than some common programming languages, such as JAVA by itself. It should be understood that similar principles as detailed herein may be applied to other programming languages and non-business logic arrangements.

Various terms are used throughout this application. For clarity, these terms are defined as follows:

"Injected code" refers to code that is provided from a first computer system for compilation and/or execution by a second computer system. The first computer system may be remotely located from the second computer system and may communicate via a network. Injected code may be compiled and executed by a system that is simultaneously executing other code.

An "injected-code runtime" refers to compiled code based on business logic code that, when executed, will operate in a runtime mode that does not permit debugging functionality. An "injected-code runtime" is executed by a virtual machine in a runtime mode.

A "runtime thread" refers to a thread that is executing a logic insight inject code. A runtime thread does not provide debugging functionality to a user or developer. A runtime thread is executed by the virtual machine in a runtime mode.

An "logic insight injected code" refers to compiled code based on business logic code that, when executed, will operate in a runtime mode and permits debugging functionality. An "logic insight injected code" is executed by a virtual machine in a runtime mode, but provides debugging functionality.

A "logic insight thread" refers to a thread that is being executed of an logic insight injected code. A logic insight thread provides debugging functionality to a developer. A logic insight thread is executed by the virtual machine in a runtime mode.

FIG. 1 illustrates an embodiment of a system 100 configured for executing runtime threads and logic insight threads simultaneously for multiple users. System 100 may include: user computer systems 110, networks 120, developer computer systems 130, and webserver 140. Webserver 140 may include: virtual machine 150, compiler 160, runtime threads 170, and logic insight threads 180.

Each user computer system 110 may be operated by a user that is associated with a runtime thread of runtime threads 170 being executed by virtual machine 150 of webserver 140. Users of user computer systems 110 may desire the runtime threads 170 to execute without debugging functionality. Accordingly, execution of each of runtime threads 170 for user computer systems 110 may not involve the use of debugging functionality, including: breakpoints, output of variable values from within the business logic code to user computer systems 110, or input being required from user computer systems 110 for processing of expressions within business logic runtime threads 170 to occur. User computer systems 110 may be unaffiliated with each other. For example, each user computer system 110 may be operated by a different user that is accessing webserver 140 via the Internet. Alternatively, some or all of user computer systems 110 may be operated by users of a particular organization, such as a business organization. Runtime threads 170 may be based on injected-code runtimes that were compiled based on business code provided to webserver 140 via user computer systems 110. In FIG. 1, three user computer systems are illustrated—this is for illustration purposes only. Fewer or additional user computer systems 110 may be associated with runtime threads being executed by virtual machine 150 of webserver 140.

Network 120-1 may represent one or more public networks and/or one or more private networks. A public network may be the Internet, and a private network may be an intranet, such as a corporate local area network. Each of user computer systems 110 may communicate with webserver 140 via network 120-1. The runtime threads 170 being executed on behalf of user computer systems 110 may involve information being exchanged between user computer systems 110 and webserver 140 via network 120-1. User computer system 110-1, on whose behalf runtime thread 170-1 is being executed by webserver 140, may involve http requests and/or other forms of information exchange occurring via network 120-1.

Network 120-2 may also represent one or more public networks and/or one or more private networks. The public network may be the Internet and the private network may be an intranet, such as a corporate local area network. Network 120-2 may represent the same network(s) or different network(s) from network 120-1. Each of developer computer systems 130 may communicate with webserver 140 via network 120-2. The logic insight thread 180-1 being executed on behalf of developer computer system 130-1 may involve information being exchanged between developer computer system 130-1 and webserver 140 via network 120-2. Such information may involve http requests and/or other forms of information exchange occurring via network 120-2.

Each developer computer system of developer computer systems 130 may be operated by a developer that is coding and/or testing business logic code. Developers operating developer computer systems 130 may desire the business logic being coded by the developers to execute with debugging functionality. As such, runtime functionality is not desired. In FIG. 1, logic insight threads 180 are illustrated as being executed by virtual machine 150. Logic insight threads 180 may be based on business logic code compiled to include debugging functionality. Execution of logic insight threads 180 may involve the use of: breakpoints, outputting of variable values from the business logic code to a developer computer system of developer computer systems 130 during execution, or input being required from a developer computer system of developer computer systems 130 for processing of individual expressions in the business logic code of logic insight thread 180-1 to occur. Developer computer systems 130 may be unaffiliated with each other. For example, each developer computer system 130 may be operated by a different developer that is coding, compiling, and/or debugging business logic code on webserver 140 via the Internet. Alternatively, some or all of developer computer systems 130 may be operated by developers of a particular organization, such as a business organization. In FIG. 1, three developer computer systems 130 are illustrated—this is for illustration purposes only. Fewer or additional developer computer systems 130 may be associated with the writing of business logic process code, such code being compiled, and executed by virtual machine 150 of webserver 140 as a logic insight runtime thread.

Developer computer systems 130 and user computer systems 110 are illustrated in FIG. 1 as distinct. It should be understood this is for the purpose of differentiating between developers, who are coding, compiling, and debugging business logic code and users on whose behalf injected code is being executed not in a debugging mode. The hardware of developer computer systems 130 and user computer systems 110 may be similar or the same. If a developer indicates that injected business logic code is to be executed as a runtime, the developer's developer computer system may be considered a user computer system. Similarly, if a user indicates that injected business logic code is to be executed for debugging, the user's user computer system may be considered a developer computer system. Accordingly, the designation of a computer system as a developer computer system or user computer system varies based on whether business logic code is compiled and executed as a runtime thread or as a logic insight thread for debugging by the developer.

Webserver 140 may include one or more computer systems. Webserver 140 may be used to compile and/or execute business logic code written by multiple developers. Such business logic code may be received from user computer systems 110 and developer computer systems 130. The business logic code compiled and executed by webserver 140 may be received via networks 120 from various users and developers. Compiler 160 may be used to compile business logic code received from user computer systems 110 and developer computer systems 130. Business logic code, once compiled, may be executed using virtual machine 150. In some embodiments, compiler 160 may be part of virtual machine 150. Business logic code received (that is, "injected" from another computer system) by webserver 140, may be compiled into either an injected-code runtime or an logic insight injected code. Compilation occurs into an injected-code runtime if debugging functionality is not desired. Compilation occurs into an logic insight injected code if debugging functionality is desired. Both injected-code runtimes and logic insight injected codes may be executed by virtual machine 150 in a runtime mode.

Virtual machine 150 may be executed by webserver 140. Virtual machine 150 may serve as a programming language interpreter. Virtual machine 150 may permit the same code to be executed by different underlying hardware (e.g., webserver 140). Virtual machine 150 may be used to execute runtime threads 170 and logic insight threads being executed by webserver 140. Virtual machine 150 may only be permitted to function in either a debugging mode or a runtime mode at a given time. As such, all runtime threads and logic insight threads being executed by virtual machine 150 may need to be running in the same mode.

Multiple threads corresponding to the same injected-code runtime may be executed at the same time. By way of example, runtime thread 170-1 may be associated with user computer system 110-1; runtime thread 170-2 may be associated with user computer system 110-2; and runtime thread 170-*n* may be associated with user computer system 110-*n*. Each runtime thread of runtime threads 170 may be executed as a runtime without debugging functionality. As such, runtime threads 170 may be executed without waiting for input to proceed from the user, and/or values of variables from within the code of the runtime threads 170 are not output for viewing or editing by the users of user computer systems 110. Runtime threads 170 may be based on the same injected-code runtime or different injected-code runtimes. As such, different injected-codes may be executed by virtual machine 150 simultaneously. For runtime threads 170 to be executed as desired for user computer systems 110 (and the associated users) without debugging functionality, virtual machine 150 may need to be in a runtime mode and not in a debugging mode.

While three runtime threads are illustrated in FIG. 1 as being executed by virtual machine 150, it should be understood that fewer or greater numbers of runtime threads may be simultaneously executed by virtual machine 150 of webserver 140.

Logic insight threads 180 represent logic insight injected codes being executed on which debugging is being performed by a developer via a remote developer computer system, such as developer computer system 130-1. Logic insight threads 180 may have been compiled by compiler 160. At the time of compiling, the developer, via developer computer system 130-1, may have supplied business logic code (such as via a web-based interface) and provided an indication to compiler 160 that debugging of the business logic code supplied by the developer computer system 130-1 to compiler 160 is desired. While developers debug business logic, users may submit business logic code to be executed by the webserver as runtime threads.

Compiler 160 may compile the business logic code supplied by developer computer system 130-1 into an logic insight injected code that is executed as logic insight thread 180-1. Based on the indication received from developer computer system 130-1 that debugging is desired, the supplied business logic code may be compiled into an injected-code logic insight rather than an injected-code runtime. An logic insight injected code may contain debugging functionality, but it is executed by the virtual machine in a runtime mode. Thus, the debugging functionality attributes of an logic insight injected code may not require virtual machine 150 to be operated in a debugging mode. When being compiled, compiler 160 may modify and/or add expressions to the business logic code received from developer computer system 130-1 to provide debugging functionality to the developer operating developer computer system 130-1. The debugging functionality may include: waiting for input from LIVM 210 before each expression coded by the developer of logic insight thread 180-1 is executed, allowing breakpoints to be set within the business logic code coded by the developer or the business logic code to be executed expression-by-expression, and providing an indication of variable values from the expressions of the logic insight threads 180 to developer computer systems 130 for display to the developers.

Accordingly, based on the additions and/or modifications to the business logic code made by compiler 160 during compilation, the runtime created (as bytecode), called the logic insight injected code, provides debugger functionality to a developer. However, to the virtual machine, the logic insight injected code being executed as a logic insight thread is a runtime similar to runtime threads 170 that are executed in runtime mode. While logic insight injected codes provide debugger functionality to developers, logic insight injected codes are not run in a debugging mode by a virtual machine. Logic insight threads 180 and runtime threads 170 are being executed simultaneously; the virtual machine functions in runtime mode for all of these threads. Further, the execution of logic insight threads does not affect the execution of runtime threads 170 any differently than other runtime threads. Similarly, the execution of runtime threads does not affect the execution of logic insight threads any differently than additional logic insight threads. Since virtual machine 150 is operating in runtime mode (and not a debugging mode) for all threads, debugger functionality being present for logic insight threads 180 does not affect other threads (runtime threads) being executed without debugger functionality. In FIG. 1, three logic insight threads 180 are illustrated—this is for illustration purposes only. Fewer or additional logic insight threads may be executed by virtual machine 150.

If the developer of developer computer system 130-1 does not provide an indication that the business logic code supplied via developer computer system 130-1 is to be compiled for debugging, the business logic code may be compiled into a injected-code runtime rather than an logic insight injected code. Compiler 160 may be configured to compile multiple pieces of business logic code simultaneously. Compiler 160 may compile business logic code while virtual machine 150 is executing one or more runtime threads 170 and one or more logic insight threads 180. At a given time, it may be possible that virtual machine 150 is only executing either runtime threads 170 or logic insight threads 180.

Figure 2:
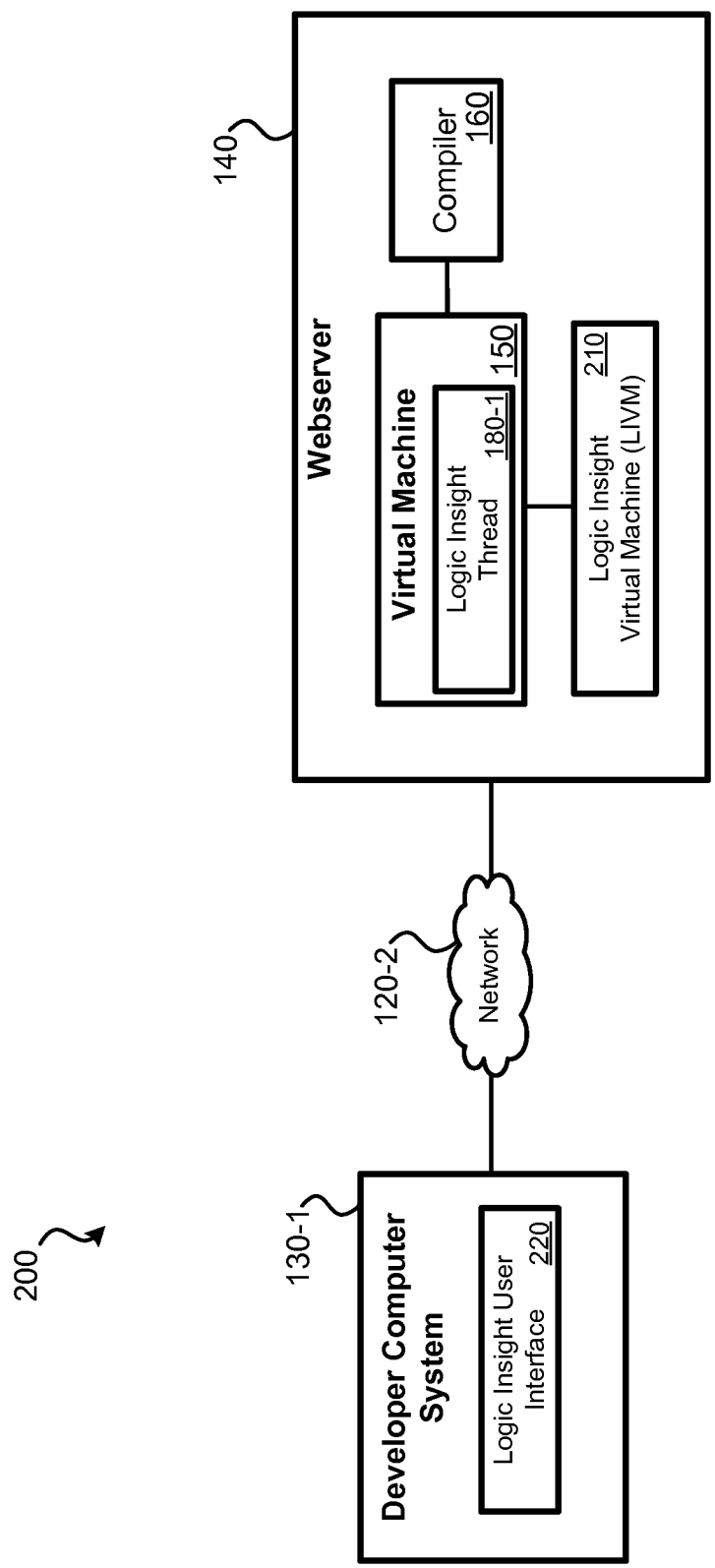
FIG. 2 illustrates an embodiment of a system configured for compiling and executing an logic insight injected code as a logic insight thread for debugging.

FIG. 2 illustrates an embodiment of a system 200 configured for compiling and executing business logic code as an logic insight injected code for debugging. System 200 may represent a more detailed embodiment of webserver 140 interacting with a particular developer computer system 130-1. As such, at least in some embodiments, system 200 is part of system 100. System 200 may include: developer computer system 130-1, network 120-2, webserver 140, virtual machine 150, compiler 160, and logic insight thread 180-1. System 200 may additionally include logic insight virtual machine 210 in communication with virtual machine 150, and logic insight user interface 220 presented by developer computer system 130-1.

Logic insight virtual machine (LIVM) 210 may be associated with a particular developer's session when debugging is being performed. A "session" may refer to an instance of a web browser of a developer or user being open with the webserver 140. Each http session may be assigned an identifier such that information received by webserver 140 from developer computer system 130-1 may be applied to the appropriate data. After an http session has been established, a session identifier may be sent with each response by developer computer system 130-1 to webserver 140.

As such, the http session of developer computer system 130-1 with webserver 140 is linked with logic insight thread 180-1 and LIVM 210, both being executed by virtual machine 150. LIVM 210 may serve as an intermediary between logic insight thread 180-1 and developer computer system 130-1. LIVM 210 may be executed by the virtual machine or by a remote computer system. A separate LIVM 210 may be executed by webserver 140 for each session. When compiler 160 compiles the business logic code to create the logic insight injected code (of which logic insight thread 180-1 is an executed instance), additional expressions may have been added and/or expressions may have been modified in the business logic code such that input is required before each expression coded by the developer is executed. LIVM 210 may serve to provide these inputs to logic insight thread 180. By logic insight thread 180-1 requiring input before each expression coded by the developer is executed, the developer is allowed to step through execution of the business logic code on an expression-by-expression basis or set breakpoints. Breakpoints selected by the developer may instruct LIVM 210 to permit continued execution of logic insight thread 180 until a breakpoint set by the developer is reached. As such, LIVM 210 may provide logic insight thread 180-1 input to permit each expression coded by the developer to be executed until a breakpoint is reached. At this point, input may be required from the developer to LIVM 210 which, in turn, transmits an instruction to virtual machine 150 for execution of logic insight thread 180-1 to continue. If a developer desires to execute the business logic code on an expression-by-expression basis, LIVM may wait until input is received from the developer after each expression executed by the logic insight runtime before the next expression of the logic insight thread is executed.

LIVM 210 may also serve to receive from logic insight thread 180 changes in variable values. These changes may be used to provide variable values to developer computer system 130-1 (e.g., for presentation to the developer). Logic insight thread 180 may be compiled such that each time a variable is created or modified, a value of the variable and an indication of the variable are output to LIVM 210. This value of the variable and the indication of the variable may be received by LIVM 210 and may be used to present an indication of the variable and the variable value to the developer via logic insight user interface 220. LIVM 210 may also indicate to the developer the expression in the business logic code of logic insight thread currently being processed (or about to be processed).

Logic insight user interface (LIUI) 220 may be used to receive business logic code from a developer at developer computer system 130-1. LIUI 220 may be a web-based interface and may be implemented via a web browser. For example, LIUI 220 may be presented as part of a webpage through which a user is permitted to enter code directly (e.g., as text) and/or select a file that contains the business logic code for uploading (injection) to webserver 140 for compilation and, possibly, execution. LIUI 220 may permit the developer to indicate that the business logic code is desired to be compiled and executed for debugging (as an logic insight injected code). LIUI 220 may permit the user to perform debugging functions before and while logic insight thread 180 is being executed. Thus, since such debugging occurs while logic insight thread 180 is running, this is referred to as real-time debugging. Such debugging functions that LIUI 220 may be used to perform includes: setting breakpoints, stepping through execution of the business logic code on an expression-by-expression basis, and/or viewing (and/or editing) of values of variables. Via a session with webserver 140, logic insight user interface 220 may be used to send input from the developer to control execution of logic insight thread 180 via LIVM 210 and to receive information about the execution of logic insight thread 180 to be output to LIUI 220 for presentation to the developer.

Figure 3:
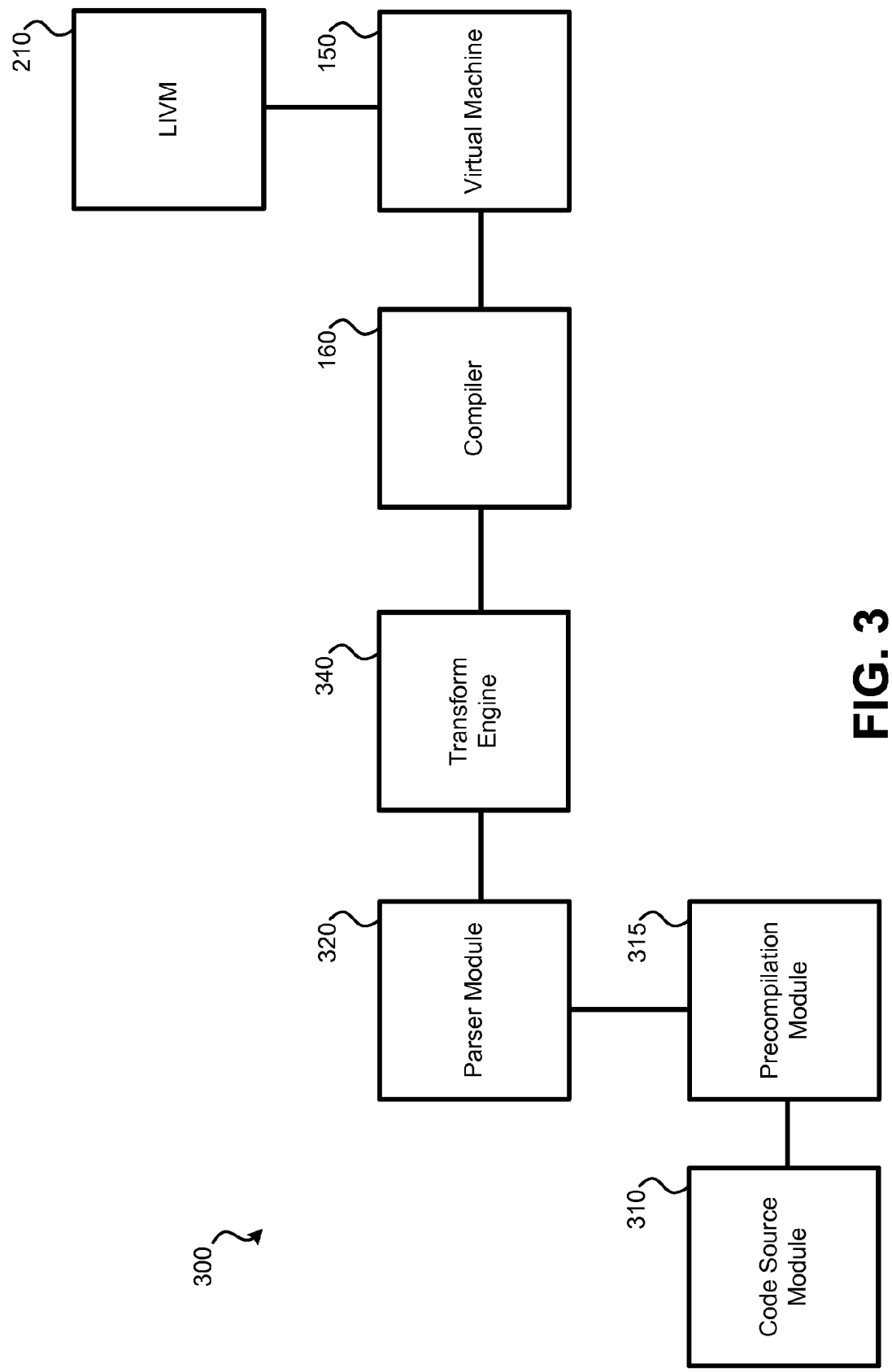
FIG. 3 illustrates an embodiment of a system configured for compiling an logic insight injected code and executing as a logic insight threads for use in debugging business logic code.

FIG. 3 illustrates an embodiment of a system 300 configured for compiling business logic code as a logic insight injected code that contains debugging functionality. System 300 represents various hardware and/or software modules that may be used to create logic insight injected codes. For instance, each of these modules, unless otherwise indicated, may be part of webserver 140 of systems 100 and 200 of FIGS. 1 and 2, respectively. Accordingly, in at least some embodiments, system 300 may be understood as a part of system 100 and/or system 200. System 300 comprises various modules, each of which may be implemented using software, firmware, and/or hardware. Components include: code source module 310, pre-compilation module 315, parser module 320, analysis engine 330, transform engine 340, compiler 160, virtual machine 150, and LIVM 210.

Code source module 310 may serve to receive business logic code. This code may be written in a syntax of a programming language that, when compiled, may be edited at the syntax tree level. For instance, JAVA may be used as the programming language for the business logic code. In some embodiments, code source module 310 may be configured to receive business logic code from a remote computer system, such as code submitted via a web-based interface as presented in FIG. 2. Such received code may be referred to as "injected" code because it is received from a remote computer system for compilation and/or execution. Code source module 310 may serve to access a file containing code that is to be compiled. The injected code may be compiled and executed by a system that is simultaneously compiling and executing other injected code.

Pre-compilation module 315 may complete part of a compilation process of the business logic code received by code source module 310. In some embodiments, pre-compilation module 315 may insert one or more expressions in the business logic code received by code source module 310. Parser module 320 may parse the business logic code containing the expressions to create a syntax tree. The syntax tree created may be an abstract syntax tree. At this juncture, it may be possible in some programming languages to modify the syntax tree prior to bytecode (which would be an logic insight injected code) being compiled.

Transform engine 340 may modify the syntax tree created by parser module 320. transform engine 340 may add or modify some or all expressions of the expressions in the syntax tree. Whenever a variable value is modified, the syntax tree may be modified such that the variable value is output to LIVM 210. Accordingly, during execution, the LIVM 210 may maintain the current values of each variable present in the business logic code. A LIUI of a developer may request the value of a variable, which LIVM 210 may provide in response. Expressions may be added such that after each expression present in the business logic code is executed, execution is halted (e.g., placed in a suspended or loop mode) until an instruction is received from LIVM 210. An indication of the expression executed or about to be executed may be provided to LIVM 210. In turn, LIVM 210 may provide an indication to a developer's LIUI of what expression has just been executed or is about to be executed. The LIVM 210 may wait for input from the developer via the LIUI before allowing virtual machine 150 to continue execution. If a developer has not indicated a breakpoint for a particular expression, LIVM 210 may allow execution of the business logic code to continue until an expression on which the developer has indicated a breakpoint is reached.

Compiler 160 may compile the modified syntax tree into bytecode. This bytecode is referenced as an logic insight injected code, which is executed as a logic insight thread. The business logic code received by code source module 310, as modified by pre-compilation module 315 and transform engine 340, may be compiled by compiler 360.

Virtual machine 150, which is in communication with LIVM 210, may execute the bytecode compiled by compiler 160. For each expression that was modified by transform engine 340, LIVM may be consulted to determine whether execution should continue. LIVM 210 may also receive values of variables (such as each time such a variable value may be modified from virtual machine 150. LIVM 210 may also receive an indication of the current expression of business logic code executed or about to be executed. Such information may be received by LIVM 210. Input from a developer computer system may be requested by LIVM 210 before the bytecode is permitted to proceed and/or information may be output to the developer (such as variable values) via an LIUI by LIVM 210.

Figure 4:
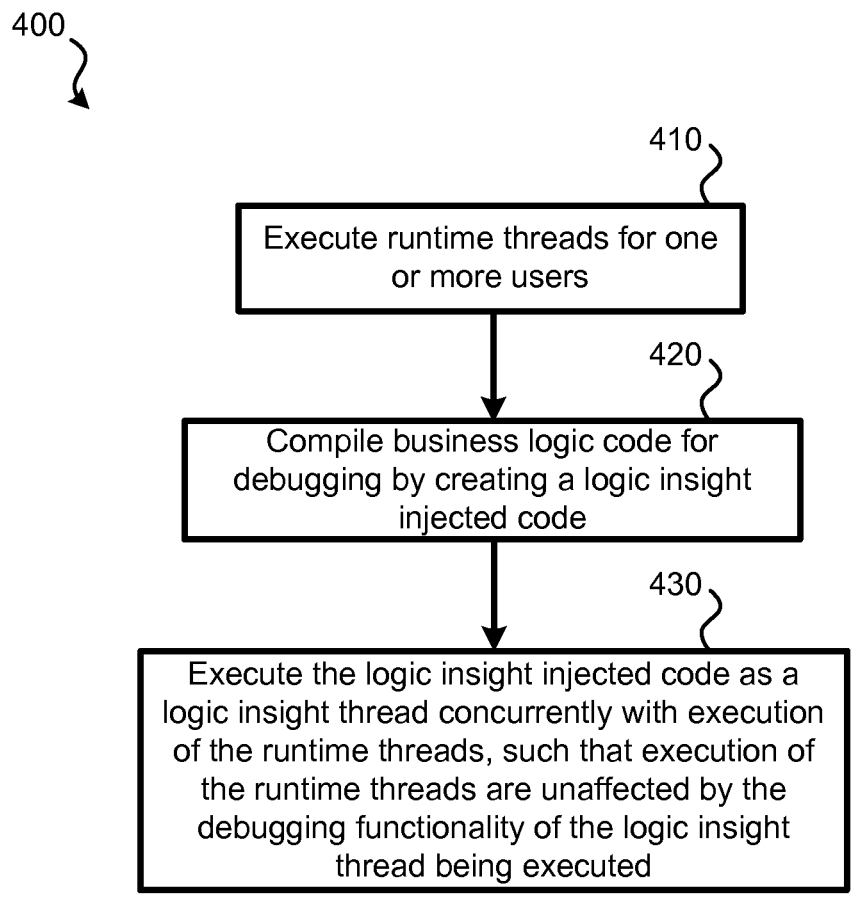
FIG. 4 illustrates an embodiment of a method for executing runtime threads and executing logic insight threads simultaneously for multiple users.

Systems 100 through 300 of FIGS. 1 through 3 may be used to perform various methods. FIG. 4 illustrates an embodiment of a method for executing runtime threads and compiling and executing a logic insight injected codes for debugging simultaneously for multiple users. Method 400 may be performed by system 100, system 200, and/or system 300. Method 400 may also be performed by some other form of system for executing runtime threads and compiling and executing logic insight injected codes. One or more computer systems may be used to perform method 400. Means for performing method 400 includes computer systems and networks.

At step 410, a webserver, or some other form or group of computer systems, may execute runtime threads for one or more users. Referring to FIG. 1, webserver 140 may execute runtime threads for users remotely accessing webserver 140 via network 120-1, which may be the Internet. The runtime threads may be based on business logic code provided for compiling and/or execution to the webserver. Users operating user computer systems 110 may be unrelated. Some or all of the runtime threads may be based on the same or different business logic runtimes. The runtime threads executed at step 410 may be executed by a virtual machine of webserver. Each runtime thread may be associated with a particular user's http session with the webserver. Each runtime thread may be executed without debugging functionality. As such, each runtime thread may not include: input being required from a user computer system indicating each expression of the code of a business logic runtime thread should be executed, user-specified breakpoints, and output of variable values from the expressions of the business logic code being executed as the business logic runtime thread. The virtual machine of the webserver that is executing all of the runtime threads may be executing these threads in a runtime mode, as opposed to a debugging mode.

At step 420, business logic code that is desired to be debugged by a developer may be compiled into an logic insight injected code. Referring to FIG. 1, a developer may provide such business logic code via a developer computer system, such as by using developer computer system 130-2, via network 120-2 (which may be the Internet) to webserver 140. Compiling may performed by compiler 160. The developer, via developer computer system 130-2, may provide an indication that the business logic code is to be compiled for debugging purposes. The compiling process may be altered because debugging functionality is desired. As such, debugging functionality may be added to the business logic code at the syntax tree level and compiled into a code-injected logic insight. Compiling of the business logic code at step 420 may occur at the same time as one or more runtime threads are being compiled and/or executed by the virtual machine of the webserver. An logic insight injected code may have debugging functionality but may not require a virtual machine to execute in a debugging mode for such functionality to be realized. The debugging functionality may include one or more of the following: the ability of a developer to select one or more breakpoints within the business logic code, the ability to step through the business logic code provided by the developer during execution on an expression-by-expression basis (in real time); the ability to view variable values present in expressions of the business logic code during execution (in real time); the ability to receive an indication when an expression begins being executed, and/or the ability to receive an indication when an expression completes being executed.

At step 430, the logic insight injected code may be executed by the virtual machine of the webserver as a logic insight thread. The execution of the logic insight thread may occur concurrently with the execution of the runtime threads of step 410. The virtual machine may execute the logic insight thread and the runtime threads in a virtual machine runtime mode. As such, the virtual machine currently executes all of the threads as runtimes and no threads in a debugging mode. However, the logic insight thread has debugging functionality because the business logic code of the logic insight thread was modified during compilation. While the logic insight thread behaves as a runtime for the virtual machine, the modifications during compilation provides a developer with functionality typically associated with the virtual machine being operated in a debugging mode. The debugging functionality present in the logic insight thread may include: the ability of a developer to select one or more breakpoints within the business logic code; the ability to step through the business logic code provided by the developer during execution on an expression-by-expression basis (in real time); the ability to view variable values present in expressions of the business logic code during execution (in real time); the ability to receive an indication when an expression begins being executed; and/or the ability to receive an indication when an expression completes being executed.

The execution of the logic insight thread may not affect execution of the runtime threads (except in the regard that it consumes memory, processing, and network resources). More specifically, the debugging functionality, such as allowing the developer to set breakpoints or allowing business logic code associated with the logic insight thread to be executed on an expression-by-expression basis does not require that such debugging functionality be present in the runtime threads. Similarly, the execution of the runtime threads does not affect execution of the logic insight thread (except in the regard that it consumes memory, processing, and network resources). While method 400 only considers a single logic insight injected code being compiled and executed as a thread by the virtual machine operating in a runtime mode, multiple logic insight injected codes may be compiled and/or executed as threads are by the same virtual machine of the same webserver.

During execution of the logic insight injected code as the logic insight thread, execution of the thread may pause or enter a loop mode until the LIVM indicates to the virtual machine that execution is permitted to continue. The LIVM may permit execution to continue for each expression unless a developer has specified a breakpoint for that expression. If a breakpoint is present, execution may be suspended until the developer provides input permitting continued execution via a LIUI to the LIVM. At a breakpoint, an indication of variable values and what expression is to be executed may be output to the LIUI via the LIVM. In some embodiments, execution may halt after each expression until the developer indicates execution is to continue via the LIUI to the LIVM. The LIVM may provide the LIUI of the developer with values for variables within the business logic code.

Figure 5:
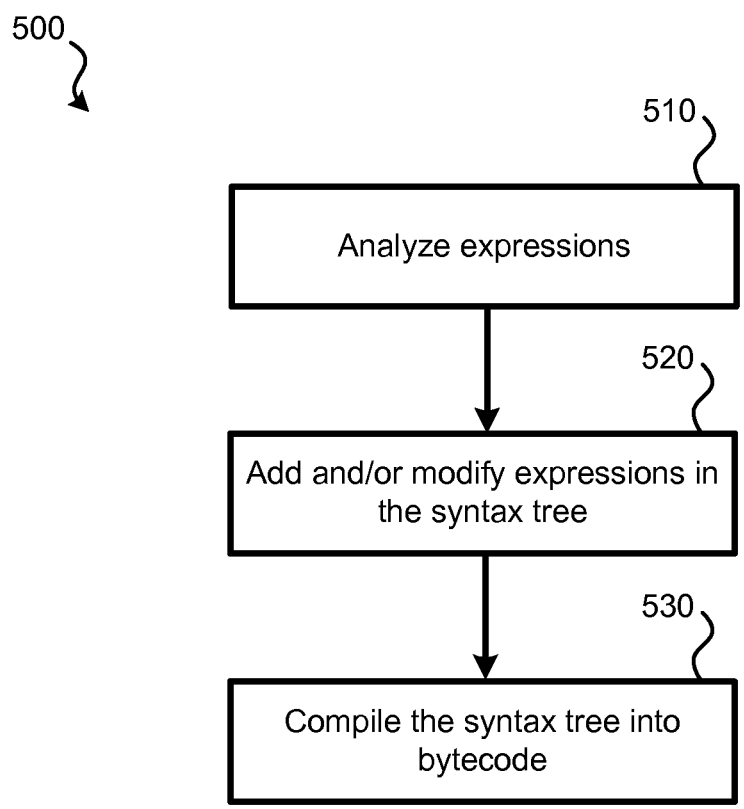
FIG. 5 illustrates an embodiment of a method for modifying code of a syntax tree during compilation to create an logic insight injected code.

FIG. 5 illustrates an embodiment of a method 500 for modifying business logic code in a syntax tree during compilation. Method 500 may result in an logic insight injected code being created. Method 500 may be performed to introduce debugging functionality to business logic code, such that the compiled logic insight injected code can be executed as a logic insight thread in a runtime mode by a virtual machine while having debugging functionality. During compilation, business logic code written by a developer may be used to construct a syntax tree. Method 500 may be performed by systems 100, 200, and/or 300. Method 500 may also be performed by some other form of system that is configured for modifying code of a syntax tree during compilation. Method 500 may be performed using one or more computer systems, such as a webserver. Method 500 may involve use of the GROOVY or JAVA programming language; it may also be possible to use other computer programming languages in conjunction with method 500. A business logic programming language may be used. Programming languages that allow for the editing of a syntax tree during compiling may permit a similar method to method 500 to be implemented.

At step 510, expressions within a syntax tree may be identified. This syntax tree may be created based on business logic code written or otherwise provided by a developer, such as to a webserver of compilation and execution via a network. This syntax tree may be created as part of the process of compiling business logic code. In some programming languages it is possible to edit code after the syntax tree has been generated. For example, compiling GROOVY or JAVA code may allow for modification of code after a syntax tree has been generated but before bytecode, which is used as the executable, has been generated. Identifying expressions present within the business logic code and identifying whenever a variable value may be modified may be accomplished by inspecting the syntax tree.

At step 520, for each expression identified, a modified expression or additional expressions may be added. Such modified or additional expressions may cause execution to be halted until input (from the LIVM) is received, modified variable values are to be output to the LIVM, an indication of a statement that execution has begun on should be output to the LIVM, and/or an indication that execution of a statement has finished should be output to the LIVM.

Following step 520, the modified syntax tree contains one or more debugging added or modified expressions. The modified syntax tree may be compiled at step 530 to result in the creation of bytecode configured to be interpreted into machine code for execution. When executed, each debugging added or modified expression may permit breakpoints to be set by a developer via the LIVM, the developer to view variable values via the LIVM, and/or the developer to view which expression is being executed. Thus, the developer is provided with debugging functionality while allowing the bytecode to be executed as a runtime by a virtual machine.

Figure 6:
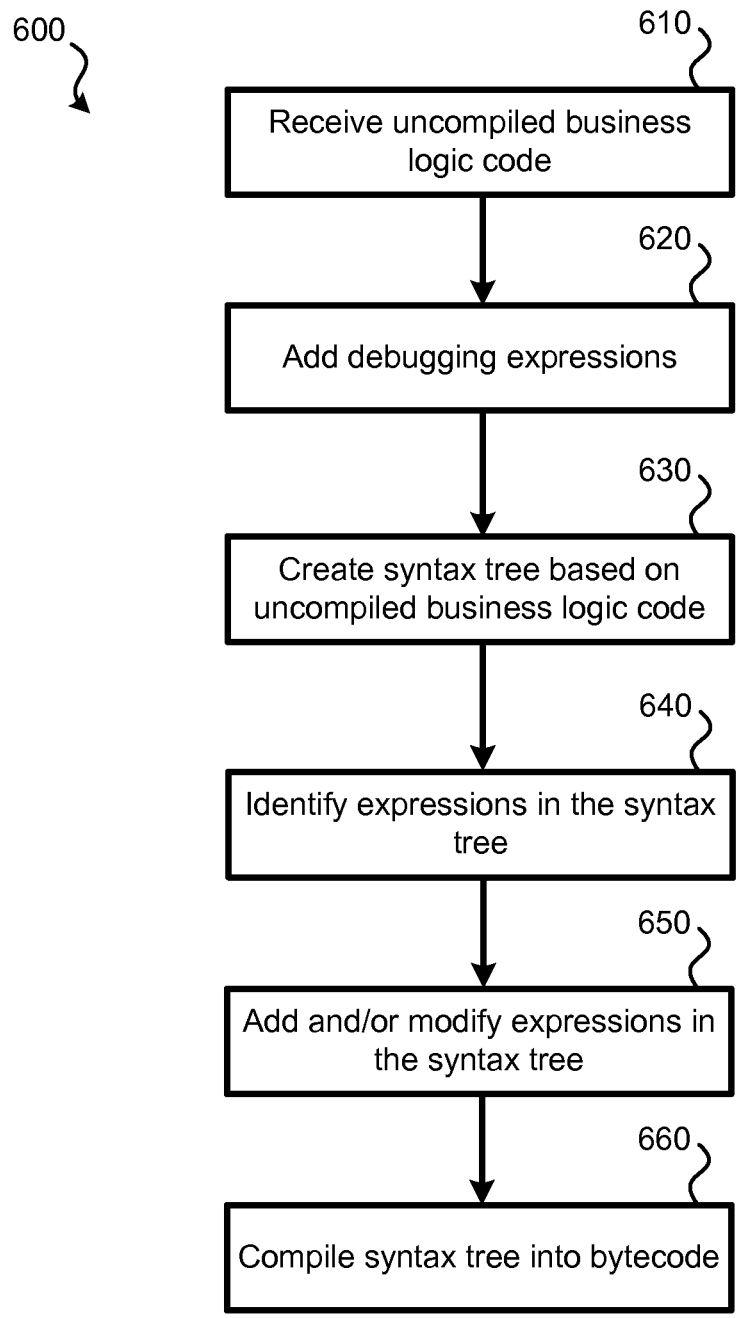
FIG. 6 illustrates an embodiment of a method for compiling business logic code to create an logic insight injected code.

FIG. 6 illustrates an embodiment of a method for compiling business logic to create an logic insight injected code. Creating the logic insight injected code runtime may include modifying code of a syntax tree during compilation of business logic code. Method 600 may be performed by systems 100, 200, and 300. Method 500 may also be performed by some other form of system that is configured for modifying code of a syntax tree during compilation. Method 600 may be performed using one or more computer systems, such as a web server. Method 600 may represent a more detailed embodiment of method 400 of FIG. 4. Method 600 may involve the use of the JAVA or GROOVY programming language; however, it may be possible to use other computer programming languages in conjunction with method 600. Programming languages that allow for the editing of a syntax tree during compiling may permit a similar method to be employed.

At step 610, uncompiled business logic code may be received. This code may be received in the form of a developer providing business logic code via a web-based interface or providing one or more files that contain uncompiled business logic code. The business logic code may be provided from a remote computer system via a network, such as the Internet. An indication may also be received that indicates the business logic code is desired to be debugged. The remote server may receive the uncompiled business logic code, compile it, and execute the business logic code (as an logic insight injected code) remote from the user computer system. Code may be received from other sources besides a remote user computer system.

At step 620, one or more debugging annotations may be added to the uncompiled business logic code. The annotations may serve as an indication to the compiler that a particular class should be called. Annotations may be added manually by a user or automatically, such as by the compiler. If GROOVY is used as the programming language, such annotations may be added as either global or local transformations, and may be triggered at the compilation step, which may be from the command line, or from a GROOVY API such as GroovyShell.parse( ). In some embodiments, instead of an annotation, some other triggering mechanism may be used, such as: a configuration switch, a properties file, or an environment variable.

At step 630, the uncompiled business logic code, as modified at step 620, may begin to be compiled. A first step of compilation may involve a syntax tree being created based on the uncompiled business logic code (and the indication that debugging is desired) received at step 610. Such an abstract syntax tree may be a tree representation of the uncompiled business logic code received at step 610 written in a programming language, such as JAVA or GROOVY. Each node of the syntax tree may correspond to expressions in the uncompiled business logic code. The programming language used for method 600 may permit editing of the syntax tree prior to the syntax tree being used to compile bytecode (or machine code).

At step 640, expressions of the syntax tree created at step 630 may be identified. Identification of expressions may be accomplished by parsing the syntax tree. Further, expressions where the value of a variable may be modified may additionally identified.

At step 650, for each expression identified, a modified expression or additional expressions may be added. Such modified or additional expressions may cause execution to be halted until input (from the LIVM) is received, modified variable values are to be output to the LIVM, an indication of a statement that execution has begun on should be output to the LIVM, and/or an indication that execution of a statement has finished should be output to the LIVM.

At step 660, following modification and addition of expressions to the syntax tree being complete, the syntax tree may be compiled. The compilation of the modified syntax tree may result in bytecode configured to be interpreted by a virtual machine into machine code for execution. The bytecode, which is an logic insight injected code may be configured to be executed in a runtime mode by a virtual machine. As such, from the point-of-view of the virtual machine, the logic insight injected code may be executed similar to an injected-code runtime.

Following step 660, creating the bytecode of the logic insight injected code based on the uncompiled business logic code received at step 610 may be complete. The created bytecode may now be executed by a virtual machine, such as virtual machine 150. This bytecode may be executed as a runtime (referred to as an logic insight injected code) by a virtual machine operating in a runtime mode (that is, not a debugging mode). Debugging functionality may be provided to the developer due to the modification and/or addition of expressions within the syntax tree created from the business logic code. While the bytecode is being executed as a logic insight thread by the virtual machine, the virtual machine may be communicating with an LIVM for permission to execute expressions and outputting to the LIVM values of variables. The LIVM may in turn be communicating with a LIUI that a developer is using to access the debugging functionality. While the logic insight thread is executing, the virtual machine may also be executing one or more runtime threads that do not having debugging functionality and/or one or more additional logic insight threads with debugging functionality.

Figure 7:
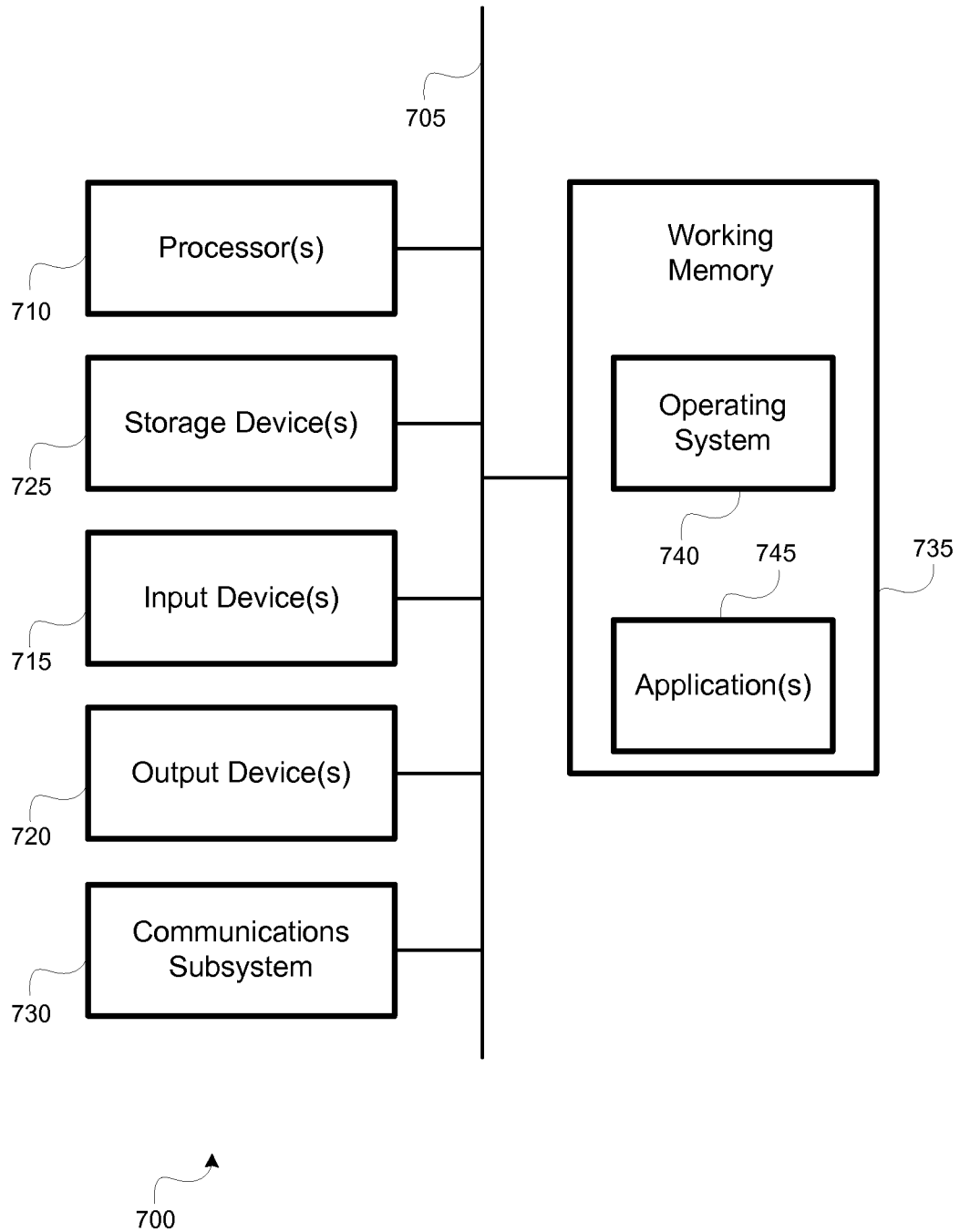
FIG. 7 illustrates an embodiment of a computer system.

FIG. 7 illustrates an embodiment of a computer system. A computer system as illustrated in FIG. 7 may be incorporated as part of the previously described computerized devices. For example, computer system 700 can represent some of the components of the webservers, the user computer system, and the developer computer systems discussed in this application. FIG. 7 provides a schematic illustration of one embodiment of a computer system 700 that can perform the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a mouse, a keyboard, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bind the scope of the claims.

What is claimed is:

1. A method for debugging logic being executed by a web server, the method comprising:
   executing, by a virtual machine of the web server, runtime threads for a plurality of remote users in a runtime mode, wherein the virtual machine is operated in a runtime mode, wherein all runtime threads execute in the runtime mode, which is distinct from a debugging mode of the virtual machine;
   compiling, by the web server, business logic code received from a developer computer system via a web-based interface into logic insight injected code, wherein the logic insight injected code is compiled from the business logic code to include debugging functionality and to execute as a debug capable runtime thread in the runtime mode;
   executing, by the virtual machine of the webserver, the logic insight injected code as the debug capable runtime thread concurrently with the runtime threads being executed for the plurality of remote users in the runtime mode, wherein:
      the debugging functionality of the logic insight injected code being executed does not affect execution of the runtime threads for the plurality of remote users; and
   executing a logic insight virtual machine, associated with a developer's debugging session, specific to the logic insight injected code, the logic insight virtual machine is distinct from the virtual machine and functions as an intermediary between the developer computer system and the debug capable runtime thread being executed by virtual machine.

2. The method for debugging logic being executed by the webserver of claim 1, wherein compiling the business logic code received from the developer computer system via the web-based interface into the logic insight injected code comprises:
   identifying, by the webserver, a plurality of expressions in the business logic code;
   modifying, by the webserver, the plurality of expressions in the business logic code to include the debugging functionality; and
   following modifying the plurality of expressions in the business logic code to include the debugging functionality, compiling the modified business logic code into the logic insight injected code.

3. The method for debugging logic being executed by the webserver of claim 2, wherein the debugging functionality includes:
   during execution, halting execution and waiting for input from the developer computer system that indicates to proceed with execution after one or more expressions of the plurality of expressions.

4. The method for debugging logic being executed by the webserver of claim 3, wherein halting execution is in response to a breakpoint received from the developer computer system.

5. The method for debugging logic being executed by the webserver of claim 1, the method further comprising:
   executing, by the virtual machine of the webserver, a plurality of logic insight threads associated with a plurality of logic insight injected codes concurrently being executed with the runtime threads for the plurality of remote users, wherein the plurality of logic insight injected codes include the logic insight injected code.

6. The method for debugging logic being executed by the webserver of claim 2, wherein the debugging functionality includes:
   during execution, sending an indication to the developer computer system that indicates an expression of the plurality of expressions has finished being executed.

7. The method for debugging logic being executed by the webserver of claim 2, wherein:
   the debugging functionality includes sending indications to the developer computer system of a value of a variable; and
   the variable is present within the plurality of expressions of the business logic code.

8. The method for debugging logic being executed by the webserver of claim 7, the method further comprising:
   sending, by the virtual machine of the webserver, an indication of the value of the variable when the value of the variable has been modified.

9. The method for debugging logic being executed by the webserver of claim 1, the method further comprising:
receiving, by the webserver from the developer computer system, the business logic code; and
receiving, by the webserver from the developer computer system, an indication the business logic code is to be debugged.

10. The method for debugging logic being executed by the webserver of claim 3, further comprising:
halting, by the virtual machine of the webserver, execution of the logic insight thread after a first expression of the plurality of expressions, wherein halting the execution of the logic insight thread does not affect execution of the runtime threads for the plurality of remote users;
receiving, by the virtual machine of the webserver, input that indicates to proceed with execution after halting; and
executing, by the virtual machine of the webserver, the logic insight thread until after a second expression of the plurality of expressions.

11. The method for debugging logic being executed by the webserver of claim 1, further comprising:
providing, by the webserver to the developer computer system via the Internet, a user interface configured to receive the business logic code for compiling and execution by the webserver.

12. The method for debugging logic being executed by the webserver of claim 1, wherein at least some of the runtime threads are based on business logic code different from at least some other runtime threads of the runtime threads.

13. A system for debugging logic being executed by a webserver, the system comprising:
a developer computer system configured to provide a web-based interface and communicate with the webserver via a network; and
the webserver comprising:
one or more processors; and
a memory communicatively coupled with and readable by the one or more processors and having stored therein processor-readable instructions which, when executed by the one or more processors, cause the one or more processors to:
execute, by a virtual machine, runtime threads for a plurality of remote users in a runtime mode, wherein the virtual machine is operated in a runtime mode, wherein all runtime threads execute in the runtime mode, which is distinct from a debugging mode of the virtual machine;
compile business logic code received from the developer computer system via the web-based interface into an logic insight injected code, wherein
the logic insight injected code is compiled from the business logic code to include debugging functionality and to execute as a debug capable runtime thread in the runtime mode;
execute, by the virtual machine, the logic insight injected code as the debug capable runtime thread concurrently with the runtime threads being executed for the plurality of remote users in the runtime mode, wherein:
the debugging functionality of the logic insight injected code being executed does not affect execution of the runtime threads for the plurality of remote users; and
execute a logic insight virtual machine, associated with a developer's debugging session, the logic insight virtual machine is distinct from the virtual machine and functions as an intermediary between the developer computer system and the debug capable runtime thread being executed by virtual machine.

14. The system for debugging logic being executed by the webserver of claim 13, wherein the processor-readable instructions that, when executed, cause the one or more processors to compile the business logic code received from the developer computer system via the web-based interface into the logic insight injected code comprise processor-readable instructions which, when executed, cause the one or more processors to:
identify a plurality of expressions in the business logic code;
modify the plurality of expressions in the business logic code to include the debugging functionality; and
following modifying the plurality of expressions in the business logic code to include debugging functionality, compile the modified business logic code into the logic insight injected code.

15. The system for debugging logic being executed by the webserver of claim 14, wherein the debugging functionality comprises processor-readable instructions that, when executed, cause the one or more processors to:
during execution, halt execution and wait for input from the developer computer system that indicates to proceed with execution after one or more expressions of the plurality of expressions.

16. The system for debugging logic being executed by the webserver of claim 15, wherein the processor-readable instructions configured to cause the one or more processors to halt execution are executed in response to a breakpoint received from the developer computer system.

17. The system for debugging logic being executed by the webserver of claim 13, wherein the processor-readable instructions, when executed, further cause the one or more processors to:
execute, by the virtual machine of the webserver, a plurality of logic insight threads associated with a plurality of logic insight injected codes concurrently with the runtime threads being executed for the plurality of remote users, wherein the plurality of logic insight injected codes include the logic insight injected code.

18. A non-transitory processor-readable medium for debugging logic being executed by a webserver, the non-transitory processor-readable medium comprising processor-readable instructions configured to cause one or more processors to:
execute, by a virtual machine, runtime threads for a plurality of remote users in a runtime mode, wherein the virtual machine is operated in a runtime mode, wherein all runtime threads execute in the runtime mode, which is distinct from a debugging mode of the virtual machine;
compile business logic code received from a developer computer system via a web-based interface into an logic insight injected code, wherein
the logic insight injected code is compiled from the business logic code to include debugging functionality and to execute as a debug capable runtime thread in the runtime mode;
execute, by the virtual machine, the logic insight injected code as the debug capable runtime thread concurrently with the runtime threads being executed for the plurality of remote users in the runtime mode, wherein:

the debugging functionality of the logic insight injected code being executed does not affect execution of the runtime threads for the plurality of remote users; and execute a logic insight virtual machine, associated with a developer's debugging session, specific to the logic insight injected code, the logic insight virtual machine is distinct from the virtual machine and functions as an intermediary between the developer computer system and the debug capable runtime thread being executed by virtual machine.

19. The non-transitory processor-readable medium for debugging logic being executed by the webserver of claim 18, wherein the processor-readable instructions are further configured to cause the one or more processors to:

provide to the developer computer system via the Internet a user interface configured to receive the business logic code for compiling and execution by the webserver.

20. The non-transitory processor-readable medium for debugging logic being executed by the webserver of claim 19, wherein the processor-readable instructions are further configured to cause the one or more processors to:

receive, from the developer computer system, the business logic code; and receive, from the developer computer system, an indication the business logic code is to be debugged.

* * * * *